United States Patent
Stuible et al.

[11] Patent Number: 5,923,163
[45] Date of Patent: Jul. 13, 1999

[54] METHOD FOR DEFECT DETECTION IN ROTATIONAL SPEED SENSORS

[75] Inventors: Ewald Stuible, Eberdingen; Walter Berger, Erligheim, both of Germany

[73] Assignee: Robert Bosch GmbH, Germany

[21] Appl. No.: 08/869,086

[22] Filed: Jun. 4, 1997

[51] Int. Cl.[6] ............... G01P 21/02; G01P 3/56; B60T 8/88; G01R 31/02

[52] U.S. Cl. ............... 324/160; 303/122.05; 324/161; 324/162; 324/503; 702/148; 702/185

[58] Field of Search ............... 324/160–163, 324/166, 173, 174, 207.25, 503, 537; 303/122.05, 122.06, 138, 168; 702/142, 145, 147, 148, 185; 188/181 R, 181 A, 181 C; 73/510, 511

[56] References Cited

U.S. PATENT DOCUMENTS

| | | | |
|---|---|---|---|
| 4,808,920 | 2/1989 | Brauninger et al. | 324/166 X |
| 4,972,145 | 11/1990 | Wood et al. | 324/160 |
| 5,095,269 | 3/1992 | McNinch, Jr. | 324/166 |
| 5,650,718 | 7/1997 | Stuible et al. | 324/161 |

*Primary Examiner*—Gerard Strecker
*Attorney, Agent, or Firm*—Fulbright & Jaworski, LLP

[57] ABSTRACT

At certain operating points, a plausibility test of the detected rotational speed signals is used to recognize an existing defect. The operating point for implementing the plausibility test is determined when it is detected that the motor vehicle has accelerated. The operating point at which defects in speed sensors are detected is determined in a simple manner but in such a way that any defect which may be present can be recognized reliably.

12 Claims, 6 Drawing Sheets

METHOD FOR DEFECT DETECTION IN ROTATIONAL SPEED SENSORS

BACKGROUND OF THE INVENTION

The invention pertains to a method and to an apparatus for detecting defects in rotational speed sensors.

It is known that the braking or forward propulsion of a motor vehicle can be influenced by interventions in the operation of the wheel brakes. This is usually done during braking processes to avoid excessive brake slip (antilock systems), in forward propulsion systems to avoid excessive drive slip (drive slip systems), and generally to stabilize the driving dynamics (driving dynamics control systems). It is essential to systems of this type to know when and to what extent the wheels are slipping (braking slip or drive slip). For this purpose, the rotational speeds or the rpm's of the wheels of the vehicle are usually detected by rotational speed sensors.

It is essential to the success of such systems that defects in the speed detection process be recognized, because defects of this type can lead under certain conditions to interventions in the brakes which have a critical effect on driving safety. One possible type of defect takes the form of, for example, a break in a connecting line; that is, the signal line which connects the rotational speed sensor to the control unit is interrupted. In addition, a signal can suddenly be lost during the operation of the vehicle even though the connecting line may still be intact; or it can occur that a speed signal is not being received at the brake control unit during the startup of the vehicle.

Rotational speed sensor defects of these kinds are usually "recognized" by means of corresponding plausibility tests at certain times before, during, or after vehicle operation. In plausibility tests of this type, the speed signals of certain individual wheels are compared with, for example, the speed signals of other wheels of the vehicle. If, for example, one of the speed signals deviates significantly from the other speed signals, then, under consideration of the operating status of the motor vehicle at the moment in question (e.g., spinning wheels), it is possible for the presence of a defect to be recognized. A wide variety of such plausibility tests is known according to the state of the art. Essential to the implementation of these tests is the determination of the operating points at which such tests are conducted.

SUMMARY OF THE INVENTION

The object of the present invention is to easily determine the operating point at which a test is run to detect the presence of a defect in a rotational speed sensor so that any defect which may be present can be detected reliably.

As already mentioned, the invention is based on the task of detecting defects in at least one of several rotational speed sensors which are used to measure the rotational speeds of the wheels of a motor vehicle, where a plausibility test of the detected rotational speed signals is carried out at certain operating points, on the basis of which test an existing defect is recognized. The core of the invention is that the operating point for implementing the plausibility test is determined when it is recognized that the vehicle has accelerated.

The background of the invention is the idea of testing to find implausibly low speed signals, which are associated with a sensor defect. Operating situations in which correctly functioning speed sensors nevertheless indicate the presence of very different wheel speeds must be treated as exceptions. According to the invention, a test initialization through the determination of the operating point occurs only when it is plausible to suspect a speed sensor defect and when the above-described false measurements used to recognize defects can be excluded. In addition, the test initialization according to the invention is not limited just to the starting-up process; on the contrary, it also makes it possible for a speed sensor test to be carried out even while the vehicle is being driven. This offers the particular advantage that defects in speed sensors, which manifest themselves in the above-described way in the form of breaks in the signal or signal losses before startup or during driving, can be detected as quickly as possible. The invention also takes into consideration the case that a defect cannot be concluded to exist simply on the basis of a break in a signal (i.e., a sudden, rapid decrease in a speed sensor signal) without taking into consideration the operating point of the vehicle at the moment in question.

An advantageous embodiment of the invention provides that, to determine the operating point, a reference velocity is formed, which is derived from the detected rotational speeds. The detection of acceleration can be implemented reliably by means of a reference velocity of this type, which represents the longitudinal velocity of the vehicle. For this purpose it is provided that the operating point is determined when it is recognized that this reference velocity has undergone a significant change. This significant change can be recognized by detecting when, after the reference velocity has fallen below a first threshold value, the reference velocity has then exceeded a second, higher threshold value. As a result, it is possible to detect reliably that the vehicle has accelerated, so that then the operating point can be determined. As an alternative, it is also possible, of course, to determine the differences between the reference velocities at various times and to compare them with a corresponding threshold value.

As an alternative or in combination with the above-described evaluation of a reference velocity, the operating point can be determined by recognizing when at least one of the detected rotational speeds has fallen below another threshold value after the reference velocity has fallen below a first threshold value. This embodiment of the invention is intended in particular for test initializations at high vehicle velocities. Test initialization occurs when the decrease in a rotational speed at a relatively high vehicle velocity suggests the presence of a defect.

In an embodiment of the invention, it is therefore provided that the operating point is determined when, after a rotational speed has fallen below an additional threshold value, it is also recognized that the reference velocity has undergone a significant change. In this embodiment, which, as mentioned, is intended in particular for test initializations at relatively high vehicle velocities, it is additionally provided that, in addition to the drop of a single rotational speed below a threshold, the longitudinal velocity of vehicle undergoes a significant increase. As a result of this embodiment, it is possible to detect in an even more reliable manner whether a speed value deviating significantly from the other rotational speed values represents a defect or not. Let us imagine, for example, that, during steady driving at 100 km/h, one of the sensors indicates that the speed has decreased to 80 km/h. When the driver now accelerates the vehicle to 110 km/h, a plausibility test is initialized. After this acceleration has occurred, it is possible to detect in a highly reliable manner whether the rotational speed deviating from the other rotational speeds represents a defect or not.

The invention, as previously described, proceeds in particular on the assumption that, as a function of the detected rotational speeds, a brake control process can be initiated to influence the brake slip or drive slip of at least one wheel. The operating point for test initialization is determined in an advantageous embodiment of the invention only if no brake control process is in progress at the same time. This embodiment thus offers additional security against the detection of nonexistent defects. The background of this is that, during a brake control process, it is possible for properly functioning wheel speed sensors to generate wheel speed signals which deviate sharply from each other. To prevent defects from being detected when they don't really exist, the other wheels are cut out of the monitoring circuit when one wheel is involved in a brake control phase.

The reference velocity which is evaluated for the purpose of the invention can be the reference velocity used for brake control. Methods and apparatuses for determining a reference velocity representing the longitudinal velocity of the vehicle in antilock or drive slip control systems are known in the state of the art. An embodiment of the invention, however, provides a specific way for determining a reference velocity for test initialization.

The reference velocity is derived from the detected rotational speeds by changing this reference velocity over time on the basis of the change over time either in the detected fastest rotational speed, in the detected second-fastest rotational speed, or in the detected third-fastest rotational speed.

Another embodiment for determining the reference velocity provides that, for the determination of the operating point, a reference velocity derived from the detected rotational speeds is formed in that:

when the reference velocity is above the detected fastest rotational speed, this reference velocity is changed over time on the basis of the change over time in the detected fastest rotational speed; and when the reference velocity is below the detected third-fastest reference velocity, this reference velocity is changed over time on the basis of the change over time in the detected third-fastest rotational speed, where in particular the fastest and second-fastest wheels are drive wheels; and when the reference velocity is below the second-fastest rotational speed, this reference velocity is changed over time on the basis of the change over time in the detected second-fastest rotational speed, where in particular the fastest and second-fastest wheels are not drive wheels.

It is provided in particular that the increase and/or the decrease in the reference velocity is limited to maximum or minimum rates of change (gradients).

It can also be provided that, when it is has been detected that the speed change of fastest and second-fastest wheels has exceeded a certain threshold value, the third-fastest rotational speed is set as the reference velocity. The goal of this embodiment of the invention is to recognize when the fastest-turning wheels are showing excessive drive slip. This is usually the case when the two drive wheels, as the fastest and second-fastest wheels, are spinning. Through a comparison of the fastest and second-fastest wheel velocities with a relatively high threshold value, it is possible to determine with certainty whether the two fastest wheels are spinning or not. If it is detected that the wheels are spinning, it is advantageous for the reference velocity to be changed on the basis of the change in the velocity of the third-fastest wheel. In this way, it is impossible for the reference velocity-dependent test initialization to initialize a test improperly.

In summary, it can be said with respect to the reference velocity that it is relatively easy to obtain and that the reliability of sensor defect tests is increased through the formation of the reference velocity according to the invention. So that a certain amount of outside interference on the second-fastest wheel can be tolerated, this adjustment can occur in the upward direction with a maximum gradient of, for example, 0.35 g. In the case of a downward adjustment, the decrease in the reference velocity is also limited to, for example, 0.7 g, as a way of increasing the capacity to tolerate outside interference. As a result, a release for a test, which can occur when the vehicle is stopped, is ignored or damped when it is caused by allowable changes in the rotational speeds of the wheels, that is, by changes which are pronounced but not defective. Such allowable wheel speed changes in the case of the fastest-turning wheel can, for example, occur as a result of aquaplaning, through the actuation of the parking brake, or as a result of the spinning of the entire vehicle, where one or more wheels are slowed down either simultaneously or in sequence or braked to a stop. In particular it can be provided that, below a certain, usually low velocity threshold of, the reference velocity is adjusted with a relatively low gradient. For example, it can be provided that, below 12 km/h, the reference velocity is adjusted at a maximum of only, for example, 0.17 g. This means that, for a test to be initialized while the vehicle is stopped, the vehicle must remain stopped for approximately 2 seconds.

In addition to the method according to the invention, an apparatus for implementing the method is also an object of the invention.

DETAILED DESCRIPTION IF THE PREFERRED EMBODIMENTS

Figure 1:
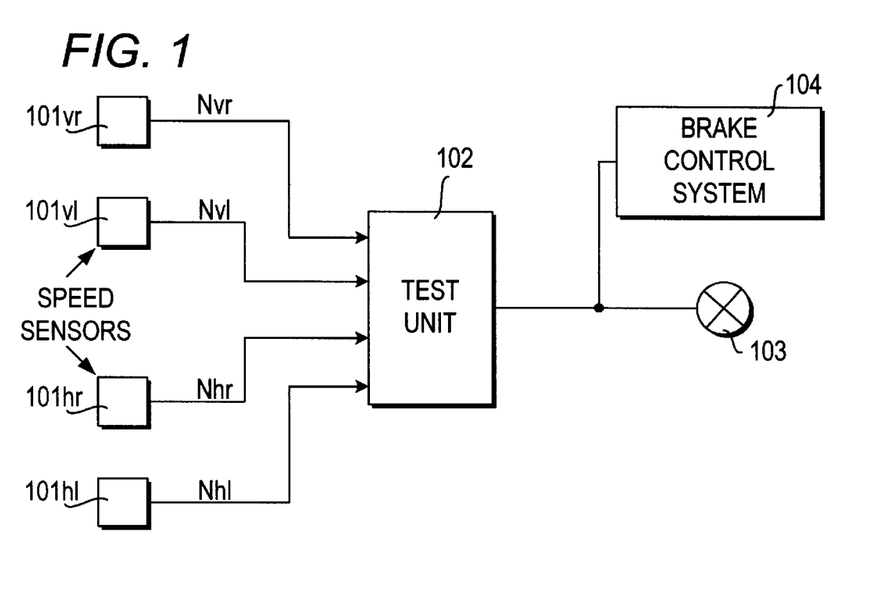
FIG. 1 is a schematic illustration of an apparatus for practicing the invention.

In the form of a general functional block diagram, FIG. 1 shows rotational speed sensors 101*vr*, 101*vl*, 101*hr*, and 101*hl* at the wheels of a motor vehicle (not shown). The rotational speeds of the wheels or the rotational velocities of the wheels Nij (Nvr, Nvl, Nhr, and Nhl) are transmitted to test unit 102. Depending on the result of the test conducted in unit 102, a warning lamp or display unit 103 is activated, which informs the driver of the vehicle that an existing defect has been identified. In addition, the brake control system, which is indicated by reference number 104, can be turned off. Brake control system 104, as known from the state of the art, processes the signals of wheel speed sensors 101*ij* to adjust the wheel brakes at the individual wheels of the vehicle (not shown). The detailed function of block 102 in this exemplary embodiment is described below on the basis of the following flow charts.

Figure 2:
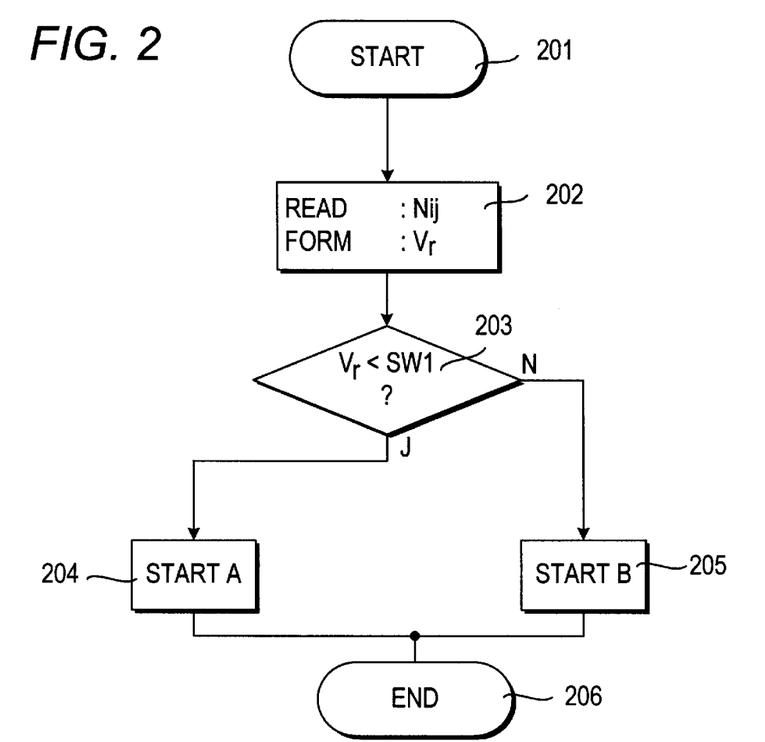
FIGS. 2–4 illustrate a flow diagram of the test sequence for detecting a sensor defect.

For this purpose, as can be seen in FIG. 2, the current wheel speed signals Nij (i =h for rear and v for front, and j=r for right and l for left) are accepted as input in step 202 after the starting step 201. In step 202, furthermore, a vehicle reference velocity $V_r$ is formed. The special way in which vehicle reference velocity $V_r$ is formed will be explained later on the basis of FIGS. 6 and 7. At this point, it is enough to say that the vehicle reference velocity corresponds essentially to the course of the longitudinal velocity of the vehicle.

In step 203, vehicle reference velocity $V_r$ is compared with a first threshold value SW1. If the vehicle reference velocity is below threshold SW1, then in step 204 program sequence A is commenced. If vehicle reference velocity $V_r$ is above threshold value SW1, program sequence B is begun in step 205. After the final step 206, the sequence shown in FIG. 2 is started again.

According to the sequence in FIG. 2, therefore, program sequence A (FIG. 3) is started when reference velocity $V_r$ representing the longitudinal velocity of the vehicle is sufficiently small. Threshold value SW1 will usually be selected to be relatively small, so that program sequence A will not be started until after the vehicle has come to a stop. After it has been determined in this way that the vehicle is at a standstill, program sequence A begins with starting step 301. In step 302, the current wheel speed signals Nij are accepted as input, and, as a function of these wheel speeds, vehicle reference velocity $V_r$ is formed. In step 303, vehicle reference velocity $V_r$ thus formed is compared with a second threshold value SW2. This threshold should be significantly greater than the value of zero. When the vehicle reference velocity exceeds threshold value SW2, this means that the vehicle has been accelerated from the stopped condition. In this case, in step 304 the program asks whether a brake control process (ABS antilock system control process) is in progress or not. Only if no antilock control process is in progress is a release signal for the test generated in step 305. If the vehicle brake control system is currently in action, then in step 306 no test initialization is done. Similarly, a test initialization is prevented if it is found in step 303 that the vehicle reference velocity is below threshold value SW2. In this case, the vehicle has not accelerated sufficiently. If sufficient acceleration has not been found, then, after final step 307, program sequence A is started again. Otherwise, the process returns to starting step 201 (FIG. 2) to recognize additional test initialization conditions.

Figure 3:
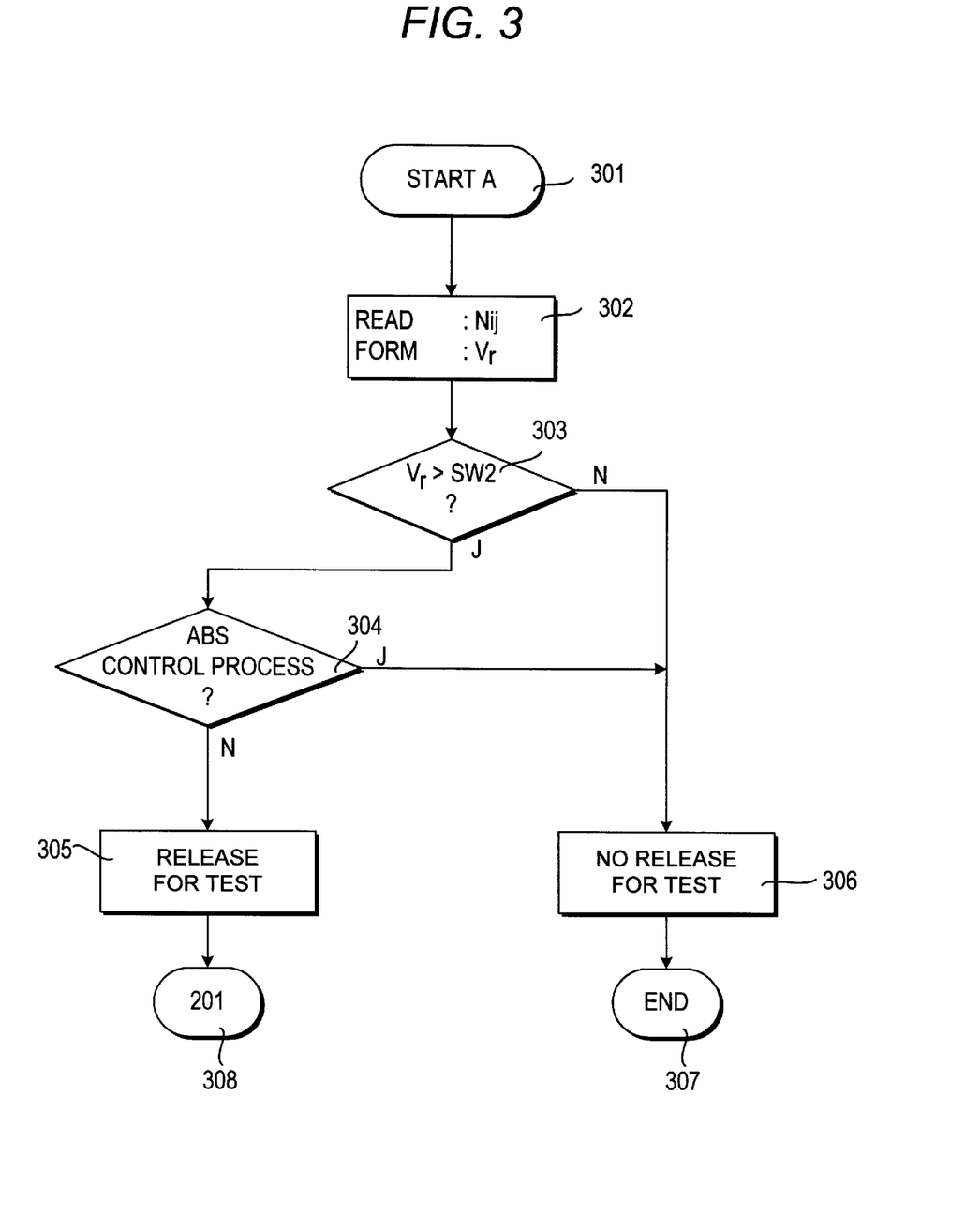

According to program sequence A, therefore, after it has been recognized that the vehicle is stopped, the program waits until the vehicle has accelerated sufficiently before beginning the test initialization, provided that no brake control process which could influence the test result is in progress at the same time.

Figure 4:
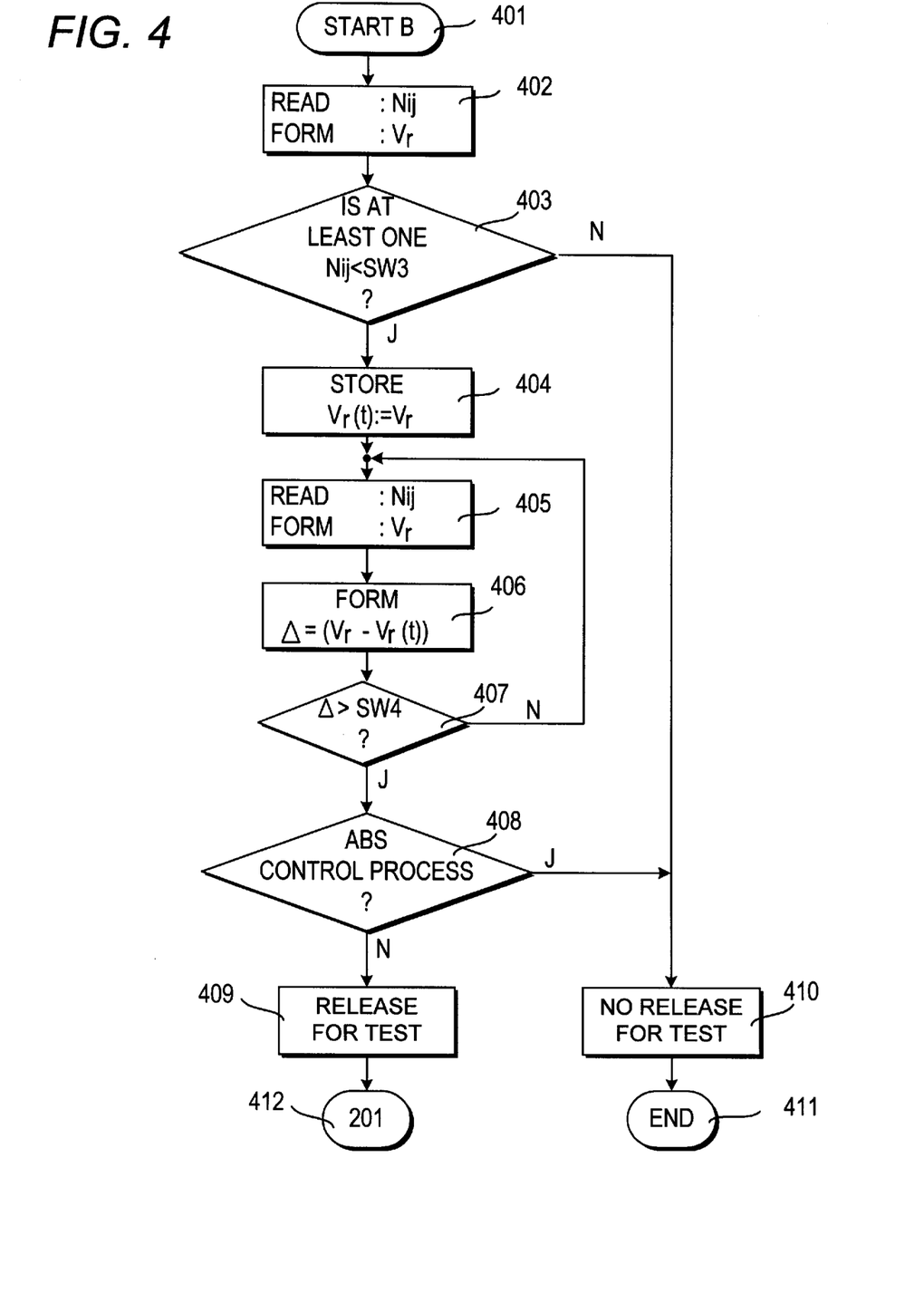

FIG. 4 shows program sequence B, which runs when it is found in the sequence shown in FIG. 2 that the vehicle is not stopped and is therefore moving at a relatively fast speed. After starting step 401, the current speed signals Nij are accepted as input in step 402, and from them vehicle reference velocity $V_r$ is formed. In step 403, the program checks to see whether at least one wheel speed Nij is below a threshold value SW3. If this is not the case, the test release is blocked immediately in step 410, and after ending step 411 the program sequence is started again. But if it has been found in step 403 that one of the wheel speeds is below threshold value SW3, then in step 404 the vehicle reference velocity $V_r(t)$ formed at this time is stored. In the next step 405, the current speed values Nij are accepted as input, and from them vehicle reference velocity $V_r$ is formed. In step 406, the difference between the current vehicle reference velocity and the reference velocity stored in step 404 is found, so that this difference can be compared in step 407 with yet another threshold value SW4. If difference is too small, sequence 405, 406, and 407 is run through again and again until the difference in step 407 is recognized as exceeding threshold value SW4. The program then proceeds with the following step 408 when, at a certain, sufficiently high vehicle velocity (step 203) and at a sufficiently low wheel speed of one wheel (step 403), a significant acceleration process of the vehicle (step 407) has occurred. In this case, the program asks in step 408 whether a brake control process is in progress or not. If brake control is in progress, as in step 304 described above, a test release is not granted. But if no brake control is in progress at that moment, then in step 409 the release for a test is granted. To recognize additional test initialization conditions, the program then returns to starting step 201 (FIG. 2). After final step 411 (after a "no" result in step 403 or a "yes" result in step 408), program sequence B shown in FIG. 4 is run again.

Figure 5:
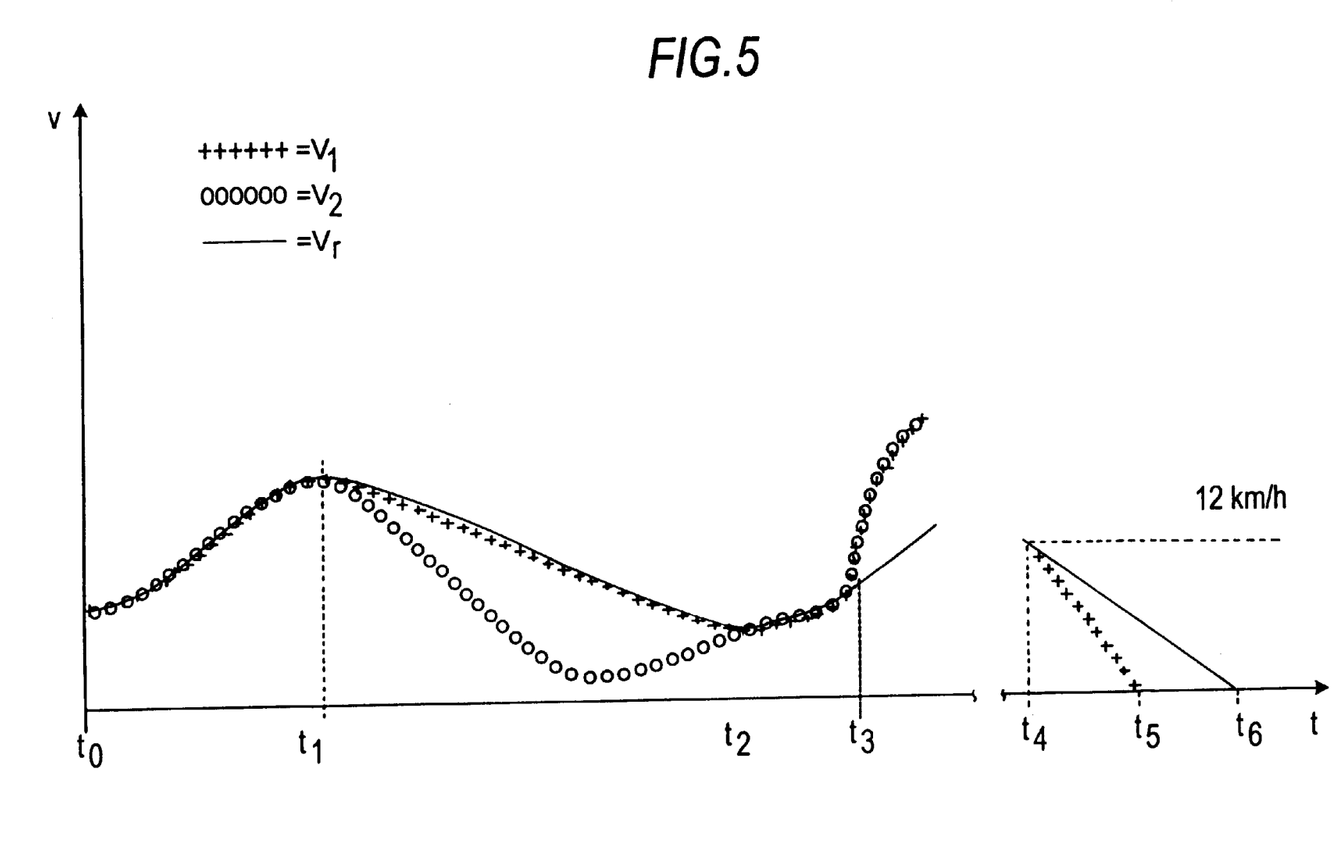
FIG. 5 shows a curve of the reference velocity formed according to the invention.

To explain how vehicle reference velocity $V_r$ is formed, FIG. 5 will be discussed in greater detail first. FIG. 5 shows the changes over time in the speed of the fastest wheel V1 and in the speed of the second-fastest wheel V2. The solid line, furthermore, shows the change in the vehicle reference velocity $V_r$ according to the invention.

After the start of the plot at time $t_0$, the vehicle accelerates normally while driving straight ahead. This means that the fastest and the second-fastest wheels are behaving in the same way. At time $t_1$, both the velocity of the fastest wheel and also the velocity of the second-fastest wheel decrease, although with different gradients. Between time $t_0$ and $t_1$, the fastest wheel V1 determines the course of vehicle reference velocity $V_r$. When time $t_3$ is reached, we see that both the fastest and also the second-fastest wheel speeds start to increase relatively quickly. In this case, the previously mentioned slope limitation for vehicle reference velocity $V_r$ goes into effect. A limitation on the decrease in the vehicle reference velocity is also provided, but this is not shown in FIG. 5. Between times $t_4$ and $t_5$, rotational speed V1 of the fastest wheel falls relatively quickly to a value of zero. Whereas the vehicle reference velocity first follows the decrease in the fastest rotational speed V1, as it did between times $t_1$ and $t_2$, when the velocity of vehicle falls below a certain value (in this exemplary embodiment, 12 km/h), this decrease in the vehicle reference velocity is limited to, for example, 0.17 g. As a result, the vehicle reference velocity thus determined does not reach a value of zero until time $t_6$.

Figure 6:
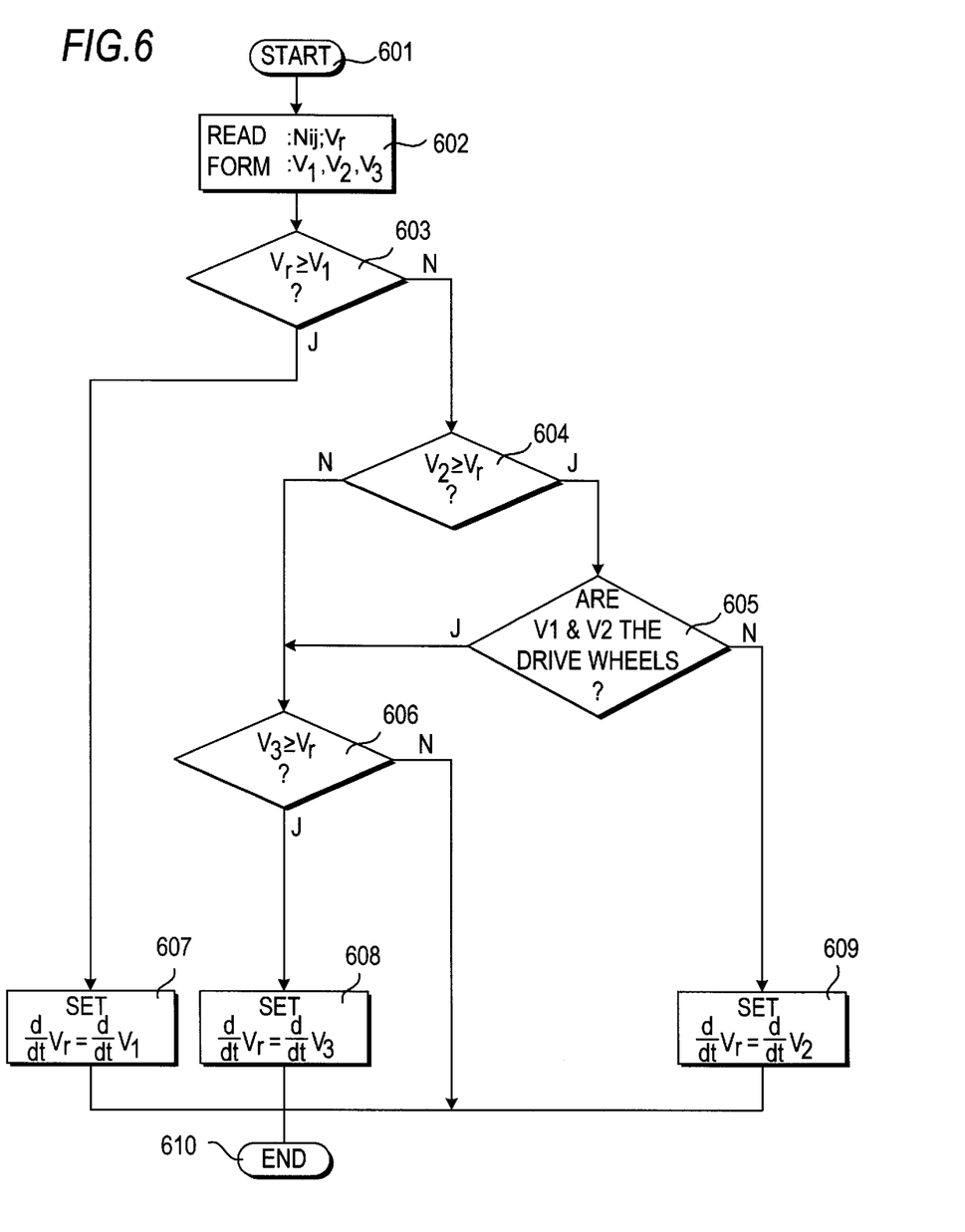
FIG. 6 is a flow diagram showing calculation of the reference velocity for the test sequence.

FIG. 6 illustrates how the reference velocity is formed. After starting step 601, wheel speeds Nij and vehicle reference velocity $V_r$ are accepted as inputs in step 602. In addition, the fastest wheel speed V1, the second-fastest wheel speed V2, and the third-fastest wheel speed V3 are formed in step 602. In step 603, the vehicle reference velocity $V_r$ is compared with the fastest wheel speed V1.

If reference velocity $V_r$ is greater than or equal to the fastest wheel velocity V1, then in step 607 the change over time $dV_r/dt$ of reference velocity $V_r$ is adjusted to match the change over time dV1/dt in the speed of the fastest wheel.

If it has been found in step 603, however, that reference velocity $V_r$ is below speed V1 of the fastest wheel, then in step 604 the program checks to see whether reference velocity $V_r$ is smaller than or equal to speed V2 of the second-fastest wheel. If this is not the case, that is, if reference velocity $V_r$ is greater than second-fastest wheel speed V2, then question 606 is to be answered "no" in all cases, and the sequence ends with step 610 without any adjustment.

If it is found in step 604 that reference velocity $V_r$ is smaller than or equal to the second-fastest rotational speed V2, then the program determines in step 605 whether or not the wheels with the fastest and second-fastest rotational speeds are the drive wheels. If so, then in step 606 the program asks whether reference velocity $V_r$ is smaller than or equal to third-fastest rotational speed V3. If it is, then in step 608 the change over time dV/dt of reference velocity $V_r$ is adjusted to match the change over time $dV_z/dt$ of the third-fastest wheel. If, however, it is found in step 606 that reference velocity $V_r$ is greater than third-fastest rotational speed V3, then final step 610 occurs without any adjustment.

If it is found in step 605 that the wheels with the fastest and the second-fastest rotational speeds are not the drive wheels, then in step 609 the change over time $dV_r/dt$ of reference velocity $V_r$ is adjusted to match the change over time $dV_2/dt$ of the rotational speed of the second-fastest wheel.

After final step 610, the program sequence shown in FIG. 6 is started again.

FIG. 6 does not show the limitation on the increase or decrease in the vehicle reference velocity mentioned several times above. In this embodiment, a request for input of this type would be inserted after step 603 and before step 607 and between step 606 and step 608. Once the change in the increase or decrease of the velocity of the fastest or second-fastest wheel exceeds a certain threshold value, the vehicle reference velocity follows this increase or decrease only with predetermined gradients of, for example, 0.35 (increase) and 0.7 g (decrease above $V_r$=12 km/h) or 0.017 g (decrease below $V_r$=12 km/h).

Figure 7:
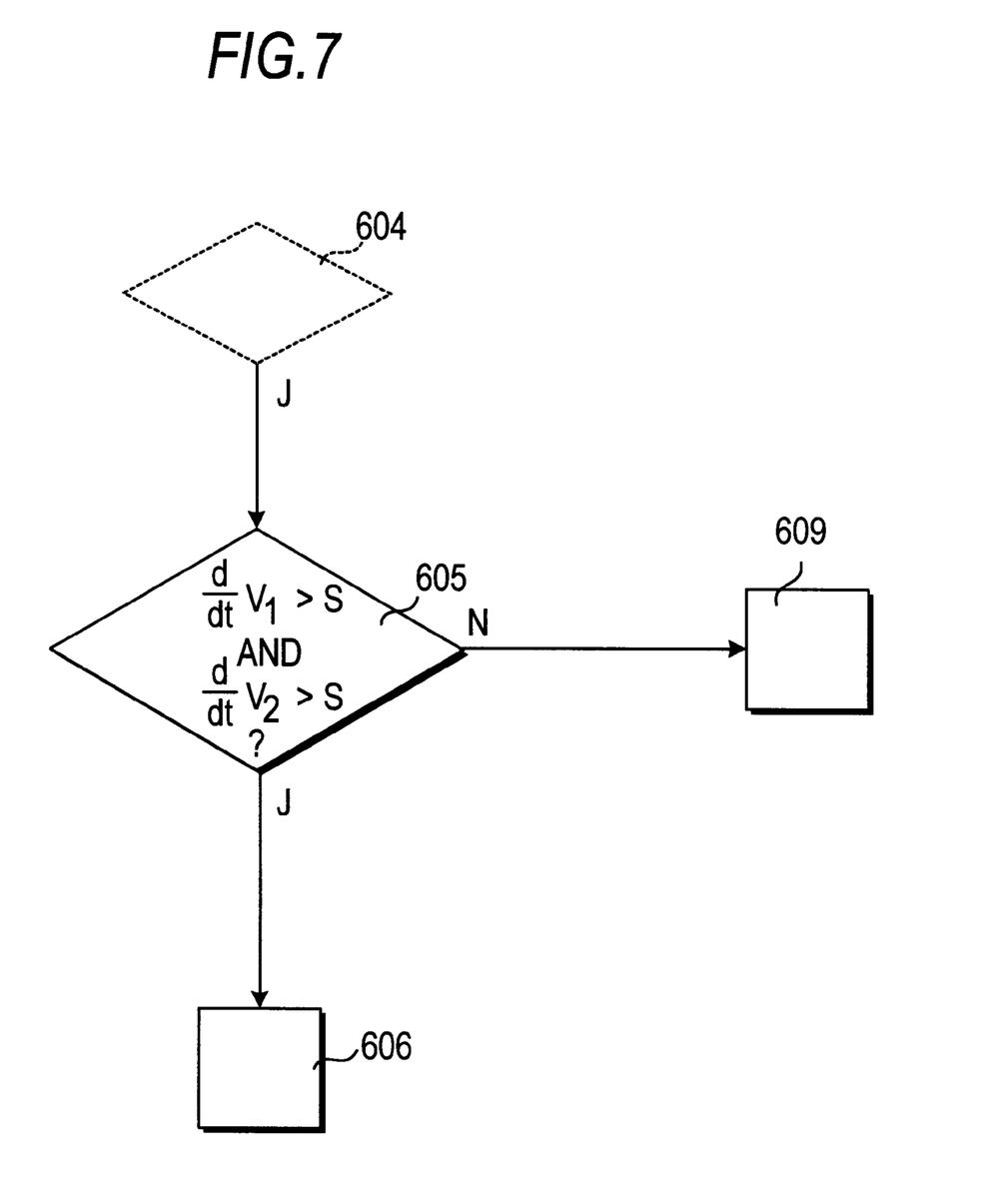
FIG. 7 is a flow diagram of an alternative procedure wherein spinning of wheels is taken into account.

FIG. 7 shows another advantageous embodiment in which the program takes into account the spinning of the fastest and second-fastest wheels. After step 604 (FIG. 6), the changes over time in the speeds of the two fastest wheels are compared with a relatively high threshold value S in step 605. This threshold value is selected so that "greater than" clearly represents spinning, that is, excessive drive slip. Such a threshold value can be, for example, 0.7 g. If the rates of change of the fastest and second-fastest wheels exceed this high threshold S, the program continues with step 606 of FIG. 6. If the changes in velocities V and V are below threshold S, the program concludes that the drive wheels are not spinning, whereupon the process continues with step 609 of FIG. 6.

As a result of this adjustment of the vehicle reference velocity as an aid in determining the release and test times, the special requirements of error tolerance on this test are taken into account. In addition, it can also be provided that the test release is carried out at certain, fixed velocity thresholds.

We claim:

1. Method for detecting defects in at least one rotational speed sensor (101*ij*) comprising: measuring a rotational speed (Nij) of a wheel of a motor vehicle; detecting that the vehicle has accelerated; determining an operating point, when it is detected that the vehicle has accelerated; detecting an existing defect by means of a plausibility test of said measured rotational speeds only when said operating point is determined.

2. Method according to claim 1, characterized in that a reference velocity ($V_r$), which is derived from the detected rotational speeds (Nij), is formed for the determination of the operating point.

3. Method according to claim 2, characterized in that the operating point is determined when it is recognized that the reference velocity ($V_r$) has changed significantly.

4. Method according to claim 3, characterized in that, after the reference velocity ($V_r$) has fallen below a first threshold value (SW1), the point at which the reference velocity ($V_r$) exceeds a second threshold value (SW2) is determined as a way of recognizing significant change.

5. Method according to claim 2, characterized in that the operating point is determined by recognizing, after the reference velocity ($V_r$) has fallen below a first threshold value (SW1), the point at which at least one of the measured rotational speeds (Nij) has fallen below a third threshold value (SW3).

6. Method according to claim 5, characterized in that the operating point is determined when, after it has been recognized that a value has fallen below the third threshold value (SW3), it is also recognized that the reference velocity ($V_r$) has changed significantly.

7. Method according to claim 1, characterized in that a brake control process for influencing the brake slip and/or drive slip of at least one wheel can be initiated as a function of the measured rotational speeds (Nij), and in that the operating point is determined only when no brake control process is being implemented at that particular time.

8. Method according to claim 2, characterized in that, for the determination of the operating point, a reference velocity ($V_r$) derived from the measured rotational speeds (Nij) is formed in such a way that a change over time ($dV_r/dt$) in this reference velocity is adjusted to match the change over time either in the detected fastest rotational speed (V1), in the detected second-fastest rotational speed (V2), or in the detected third-fastest rotational speed (V3).

9. Method according to claim 2, characterized in that, to determine the operating point, a reference velocity ($V_r$) derived from the detected rotational speeds (Nij) is formed in such a way that:

when the reference velocity ($V_r$) is above the measured fastest rotational speed (V1), the change over time ($dV_r/dt$) in this reference velocity is adjusted to match the change over time ($dV1/dt$) of the detected fastest rotational speed (V1); and when the reference velocity ($V_r$) is below the measured third-fastest rotational speed (V3), the change over time ($dV_r/dt$) of this reference velocity is adjusted to match the change over time ($dV3/dt$) of the detected third-fastest rotational speed (V3), where in particular the fastest and second-fastest wheels are the drive wheels; and when the reference velocity ($V_r$) is below the detected second-fastest rotational speed (V2), the change over time ($dV_r/dt$) in this reference velocity is adjusted to match the change over time ($dV2/dt$) of the detected second-fastest rotational speed (V2), where in particular the fastest and second-fastest wheels are not drive wheels.

10. Method according to claim 8, characterized in that, when the changes over time in the detected fastest rotational speed (V1) and in the detected second-fastest rotational speed (V2) exceed a threshold value (S), the change over time ($dV_r/dt$) in the reference velocity is adjusted to match the change over time ($dV3/dt$) in the detected third-fastest rotational speed (V3).

11. Method according to claim 2, characterized in that the increase and/or the decrease in the reference velocity is limited to values which can be predetermined.

12. Apparatus for implementing the method according to claim 1, characterized in that a means (102) for detecting defects in at least one of several speed sensors (101*ij*) detecting the rotational speeds (Nij) of wheels of a motor vehicle are provided, by means of which, at a certain operating point, an existing defect can be recognized by means of a plausibility test of measured rotational movements, characterized in that the means (102) are designed in such a way that the operating point is detected that the vehicle has accelerated.

* * * * *